M. HAUBEL.
ATTACHMENT FOR SELF BINDERS.
APPLICATION FILED JUNE 13, 1913.
1,115,191.
Patented Oct. 27, 1914.
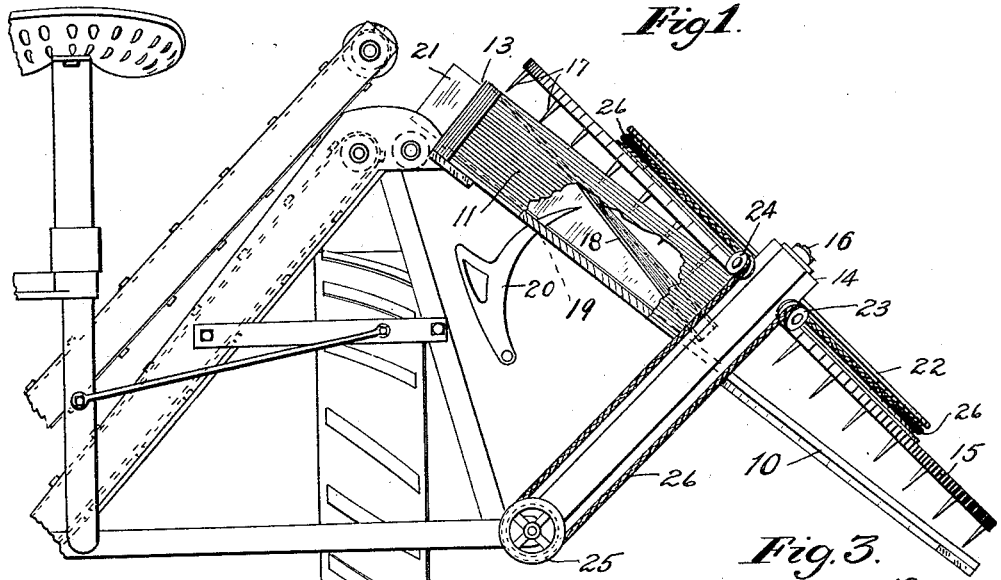
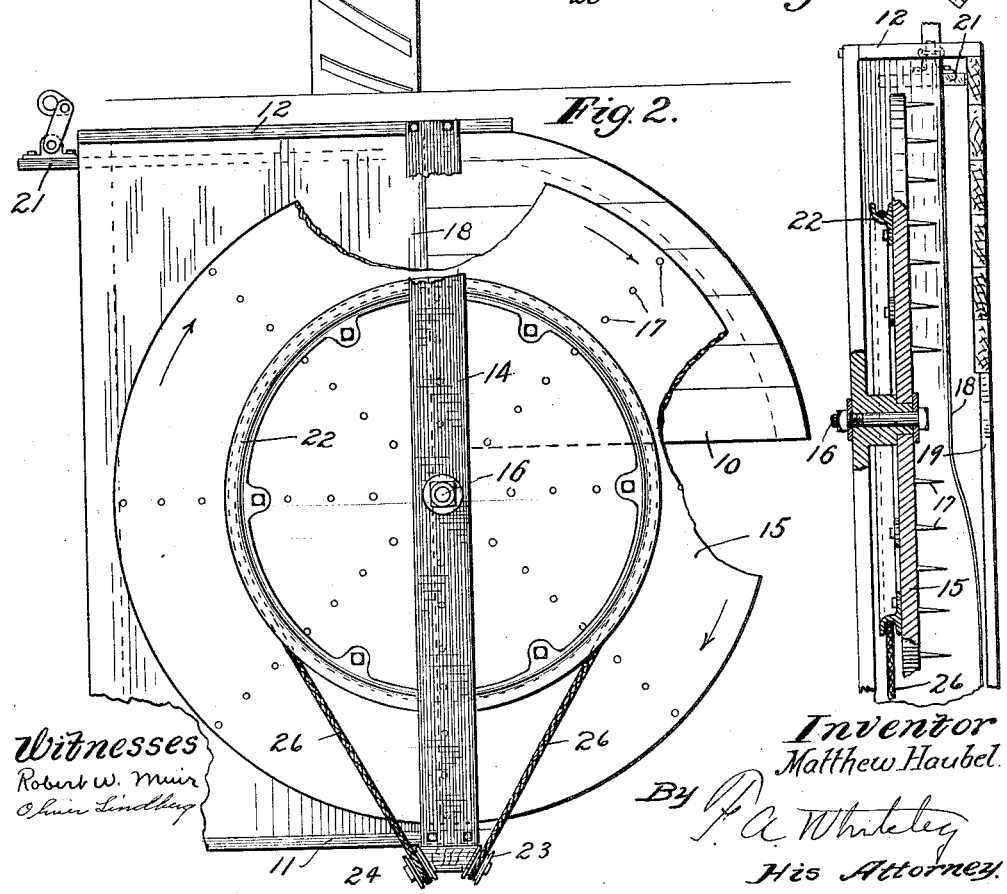

UNITED STATES PATENT OFFICE.

MATTHEW HAUBEL, OF COLUMBUS TOWNSHIP, ANOKA COUNTY, MINNESOTA.

ATTACHMENT FOR SELF-BINDERS.

1,115,191. Specification of Letters Patent. Patented Oct. 27, 1914.

Application filed June 13, 1913. Serial No. 773,466.

*To all whom it may concern:*

Be it known that I, MATTHEW HAUBEL, a citizen of the United States, residing at Columbus township, in the county of Anoka and State of Minnesota, have invented certain new and useful Improvements in Attachments for Self-Binders, of which the following is a specification.

My invention relates to a new and improved attachment for self binders and has for its object to provide such an attachment that will enable grain or grass to be delivered onto the ground from the binder in a continuous row having all the butts of the grain or grass in substantially a line parallel to the line of travel of the machine.

In the past it has been difficult to provide a means for cutting and curing wire grass and other grasses which are used for manufacturing carpets, rugs, etc. This grass is cut while green and cannot be bound owing to the fact that the inside of the bundle would not cure. Disconnecting the binder mechanism and permitting the grass to fall directly through onto the ground does not remedy this objection because the grass is deposited on the ground in a relatively narrow line running parallel with the line of travel of the machine and the grass that is on the bottom of the pile does not cure.

In the use of my device the binding mechanism is detached and my device is set upon the binding deck. As the grass is cut and delivered by the mechanism to the binder deck the butts of the grass face forwardly. When my rotating disk comes in contact with the grass it turns it and deposits it on the ground at right angles to the line of travel of the machine, thus all of the grass is spread out over a much larger surface than formerly and therefore it cures much better and has no tendency to spoil.

The full objects and advantages of my invention will appear in connection with the detailed description thereof and are particularly pointed out in the claims.

In the drawings, illustrating the application of my invention in one form, Figure 1 is a rear view of my invention showing it attached to a binder, which is somewhat diagrammatically shown. Fig. 2 is a plan view of my invention showing it attached to the binder, and Fig. 3 is a central cross section of the same.

The attachment comprises a base member 10 to which is attached side members 11 and 12 and cross pieces 13 and 14 mounted on said side members. The entire attachment is placed on the binding deck of a binder and is fastened thereto by any convenient means, not shown. Beneath cross piece 14 is suspended a disk 15 by means of a bolt 16. Cross piece 14 is mounted in such a way that its lower side is nearer base member 10 than its upper side. To the under side of disk 15 are attached a plurality of pins or projections 17 arranged radially on disk 15 and constructed of such length as to engage the grain or grass as it comes down base member 10. Cross piece 13 is mounted at the upper end of the side members 11 and 12 at a sufficient height above the base member 10 to permit the easy entering of the grain or grass between said cross piece 13 and base member 10. Mounted upon cross piece 13 is an apron 18 of metal or other suitable material, which extends beneath the disk 15 in such a way as to permit the grain or grass to pass beneath it while at the same time enabling the disk 15 to rotate without interfering to check the downward progress of the grain or grass. Base member 10 is a plane floor and has its lower rear quadrant cut away to enable the grain or grass to be dumped on the ground after having been turned by disk 15. Base member 10 is also preferably provided with slots 19 which will register with the slots in the binding deck to permit the packer arms 20, as shown in Fig. 1, to operate to cause the grain or grass to move freely down the incline. The attachment is so constructed as to enable the butt adjuster 21 of the binder to operate and perform its regular function, the preferred form being to have the adjuster inside of side member 12. Mounted upon disk 15 is a pulley 22 which connects by means of guide pulleys 23 and 24 with the driving mechanism of the binder. This connection is preferably made by means of pulley 25 attached to the pitman driving shaft. A belt 26 serves to transmit the power from the binder mechanism to the attachment.

In operation the regular binding mechanism of the self binder would be detached and my device attached in its place. As the grain or grass comes up from the cutting mechanism to the binding deck it is deposited on base member 10 beneath the cross piece 13. The packing arms 20 and the butt adjuster 21 serve to cause a continuous sheet of grass with its butt ends all squared to flow down the incline. As the grass reaches the point where it comes out from beneath apron 18 it comes in contact with the pins 17 mounted on the bottom of disk 15. These pins are radially mounted and travel faster than the sheet of grass so that they serve to turn the butts of the grass around to an angle of ninety degrees from their former course where the grass is dropped from base member 10 because of the fact that the lower rear quadrant of the same is cut away. By this means the grass is deposited on the ground with its butts all substantially in the same plane and in a line parallel with the line of travel of the machine. In this way the grass is spread over a much greater surface of ground and consequently has a much better chance to cure as the piling up is entirely obviated.

My invention is simple, inexpensive to build, durable and can easily be attached to any binder. Its advantages in use are obvious.

I claim:

1. The combination with the discharge deck of a grain binder and the means for cutting grain or grass and delivering the same in a continuous sheet to said deck with the butt ends all turned forwardly and in the same plane, of an attachment mounted upon said deck comprising a frame, a circular disk rotatably mounted upon said frame above said deck, a plurality of pins projecting from the under side of said disk and arranged radially with respect thereto to act upon said sheet to turn the grain or grass and deliver the same on the ground in a continuous row having all the butts of the grass in substantially a line parallel to the line of travel of the machine, means mounted on the upper portion of said frame to prevent the rotating disk from interfering with the downward movement of the grass, and means connecting the disk with the driving mechanism of the binder to rotate the same.

2. The combination with the discharge deck of a grain binder and the means for cutting grain or grass and delivering the same in a continuous sheet to said deck with the butt ends all turned forwardly and in the same plane, of an attachment mounted upon said deck comprising a base member and a frame, a circular disk rotatably mounted upon said frame at an angle which causes the disk to travel closer to the lower part of the base member, a plurality of pins projecting from the under side of said disk and arranged radially with respect thereto to act upon said sheet to turn the grain or grass and deliver the same on the ground in a continuous row having all the butts of the grass in substantially a line parallel to the line of travel of the machine, means mounted on the upper portion of said frame to prevent the rotating disk from interfering with the downward movement of the grass, and means connecting the disk with the driving mechanism of the binder to rotate the same.

3. The combination with the discharge deck of a grain binder and the means for cutting grain or grass and delivering the same in a continuous sheet to said deck with the butt ends all turned forwardly and in the same plane, of an attachment mounted upon said deck, said attachment comprising a frame including side members and a base member having a plane floor with its lower rear quadrant cut away, a circular disk rotatably mounted upon said frame, a plurality of pins projecting from the under side of said disk and arranged radially with respect thereto and operating to move the grain in a semicircle to the edge of said cut-away portion of the base member from which said grain falls to the ground in a continuous row having all the butts substantially in a line parallel to the line of travel of the machine, an apron mounted on said side members at their upper end and extending half way beneath the disk to prevent the rotating disk from interfering with the downward movement of the grain, and means connecting the disk with the driving mechanism of the binder to rotate the same.

4. The combination with the discharge deck of a grain binder and the means for cutting grain or grass and delivering the same in a continuous sheet to said deck with the butt ends all turned forwardly, of an attachment mounted upon said deck, comprising a substantially circular floor member having the lower rear quadrant cut away, a circular disk rotatably supported in spaced relation above said floor member, means for rotating the disk, and means carried by the disk and acting upon said sheet to turn the grain or grass and deliver the same over the edge of said cut away portion from which said grain will fall to the ground in a continuous row having all the butts of the grass in a line substantially parallel to the line of travel of the machine.

5. The combination with the discharge deck of a grain binder and the means for cutting grain or grass and delivering the same in a continuous sheet to said deck with the butt ends all turned forwardly, of an attachment mounted upon said deck, comprising a substantially circular floor member having the lower rear quadrant cut away, a circular disk rotatably supported in spaced relation above said floor member, means for rotatating the disk, means carried by the disk and acting upon said sheet to turn the grain or grass and deliver the same over the edge of said cut away portion from which said grain will fall to the ground in a continuous row having all the butts of the grass in a line substantially parallel to the line of travel of the machine, and means above the upper portion of said floor member to prevent the rotating disk and means carried thereby from interfering with the movement of the grass over the floor member.

6. The combination with the discharge deck of a grain binder and the means for cutting grain or grass and delivering the same in a continuous sheet to said deck with the butt ends all turned forwardly and the means for adjusting the butts squarely, of an attachment mounted upon said deck, said attachment comprising a base member upon which the grain is delivered, and means above and spaced from said base member and continuously operated in coöperation with said base member to act upon the sheet of grain or grass thereon and move the same over and off of the base member so that it will fall to the ground in a continuous row having all the butts in substantially a line parallel to the line of travel of the machine.

In testimony whereof I affix my signature in presence of two witnesses.

MATTHEW HAUBEL.

Witnesses:
CHARLES E. KANNADY,
INEZ C. KANNADY.

---

Copies of this patent may be obtained for five cents each, by addressing the "Commissioner of Patents, Washington, D. C."